United States Patent [19]

Osawa et al.

[11] Patent Number: 5,553,944
[45] Date of Patent: Sep. 10, 1996

[54] UNDER SEAL FOR LINEAR GUIDE APPARATUS

[75] Inventors: Nobuyuki Osawa; Shizuo Kashiwagi, both of Gunma, Japan

[73] Assignee: NSK Ltd., Tokyo, Japan

[21] Appl. No.: 425,485

[22] Filed: Apr. 20, 1995

[30] Foreign Application Priority Data

Apr. 27, 1994 [JP] Japan .................................. 6-090219

[51] Int. Cl.$^6$ .................................................. F16C 29/06
[52] U.S. Cl. .................................................. 384/15; 384/45
[58] Field of Search ................................. 384/15, 45, 49

[56] References Cited

U.S. PATENT DOCUMENTS

| | | | |
|---|---|---|---|
| 4,886,376 | 12/1984 | Osawa | 384/45 X |
| 4,921,358 | 5/1990 | Kasuga et al. | 384/15 |
| 5,149,205 | 9/1992 | Tsukada | 384/15 |
| 5,360,271 | 11/1994 | Agari | 384/15 |
| 5,362,155 | 11/1994 | Ichida | 384/15 |

*Primary Examiner*—Thomas R. Hannon
*Attorney, Agent, or Firm*—Sughrue, Mion, Zinn, Macpeak & Seas

[57] ABSTRACT

A linear guide apparatus provides a guide rail extending axially and including a first rolling element groove formed on a side surface; a slider fitted with the guide rail and including a sleeve portion and a second rolling element groove formed on an inner side surface of the sleeve portion, the second rolling element groove of the slider confronting the first rolling element groove of the guide rail; and an under seal attached to a lower portion of the sleeve portion of the slider and projected from the inner side surface of the sleeve portion to slidingly contact with a surface of the guide rail, the under seal including a first projection arranged at an outer edge portion of a width of the under seal, the width being orthogonal to an axial direction of the under seal, the first projection having resiliency for pressing an inner edge portion of the under seal onto the guide rail. The under seal can be attached to the slider correctly without making displacement to ensure a proper seal margin.

8 Claims, 2 Drawing Sheets

UNDER SEAL FOR LINEAR GUIDE APPARATUS

BACKGROUND OF THE INVENTION

The present invention relates to an improvement of an under seal for a linear guide apparatus used for machine tools and industrial machinery.

A conventional under seal for a linear guide apparatus is of an insertion type which is proposed in U.S. Pat. No. 4,921,358 applied for by the present applicant. The conventional linear guide apparatus to which the under seal is applied is of such a type that a slider is fitted into an axially extending guide rail so as to be movable in the axial direction, the guide rail having ball rolling grooves axially extending in both side surfaces of the guide rail. The slider includes a slider main body and end caps fitted to the end portions of the slider main body. In the inner side surfaces of the slider main body are provided ball rolling grooves confronting the ball rolling grooves of the guide rail. On a thick wall portion of each of sleeve portions of the slider main body are provided ball return paths, which are through holes extending in parallel with these ball rolling grooves. On the other hand, each end cap has semiarcuate curved paths that allow the ball return paths to communicate with the ball rolling grooves, respectively. Thus, the slider can move relative to the guide rail in the axial direction through the circulation of a plurality of rolling balls loaded to both the ball rolling grooves confronting each other, the ball return paths, and the curved paths.

Each end cap of the linear guide apparatus has a seal holding groove formed in a surface fitting with the slider main body, ends of the under seal being inserted into the seal holding groove. Further, each sleeve portion of the slider main body has an under seal receiving stepped portion formed in the lower surface thereof and receding from the lower face of the slider main body.

As shown in FIG. 7, the under seal includes a lip portion and a rubber body. The lip portion slidingly contacts a surface of the guide rail. The rubber body, fixed to a core bar, has resilient projections 46 projected upward at both ends of the core bar in the axial direction thereof. The under seal is fitted into the under seal receiving stepped portions of the slider main body by inserting both ends of the under seal into the seal holding grooves of each end cap. As a result of this design, the resilient projections projected at both ends of the under seal are pressed onto the surfaces of the seal holding grooves, thereby allowing the under seal to be held in the seal holding grooves with the resilient force. The under seal is easy to be fixed to the end cap at once.

However, the aforementioned conventional under seal for the linear guide apparatus attaches importance to fixing the under seal so as to prevent the under seal from falling away from the slider. Accordingly, it is difficult for an unskilled person to attach the under seal properly to the end caps, and this has led to the problem of deteriorating the sealing efficiency due to improper attachment.

Incidentally, a small margin of adjustment (play) is provided between the seal holding groove of each end cap and the corresponding end portion of the under seal that is inserted into the holding groove so that the user can attach the under seal to the end caps with ease. In the case where the slider is shipped separately from the guide rail so that the slider will be assembled to the guide rail by the user or in a like case, the slider may be displaced from the guide rail by the margin of adjustment. As a result, a clearance, although very small, in some cases, may be produced between the lip portion of the under seal and the surface of the guide rail which must tightly contact with each other.

SUMMARY OF THE INVENTION

The present invention has been made in view of a conventional problem. The object of the present invention is therefore to provide an under seal which can be attached by an unskilled user correctly without displacement and which can always ensure proper seal margins.

To achieve the above object, the present invention is applied to an under seal for a linear guide apparatus in which the under seal is attached to a lower portion of a slider fitted with a guide rail. The guide rail, which is long, has axially extending rolling element rolling grooves on both side surfaces thereof. The slider has rolling element rolling grooves on inner side surfaces thereof, the rolling element rolling grooves of the slider confronting the rolling element rolling grooves of the guide rail. The under seal slidingly contacts with a surface of the guide rail so as to project from inner sides of sleeve portions of the slider. In such an under seal for a linear guide apparatus, projections are arranged at outer edge portions of a width of the under seal, the width being orthogonal to the axial direction of the under seal and the projections having resiliency for biasing an inner edge portion of the under seal onto the guide rail.

The under seal is attached to the end caps by inserting the end portions of the under seal into the under seal holding grooves formed in the lower surface of the slider. A margin of adjustment is provided between each under seal holding groove and the corresponding end portion of the under seal, so that the insertion operation can be performed with ease.

During the insertion, the projections arranged on the outer edge sides of the under seal interfere with the slider to prevent the inner edge portion of the under seal from receding too much. When the slider is attached to the guide rail, these projections push the under seal inward by a resilient force thereof so that the seal lip placed on the inner edge portion of the under seal is slightly biased onto the surface of the guide rail. Therefore, there is no likelihood that a clearance may be produced between the seal lip and the surface of the guide rail.

DETAILED DESCRIPTION OF THE PREFERRED EMBODIMENT

An embodiment of the present invention will now be described with reference to the accompanying drawings.

Figure 1:
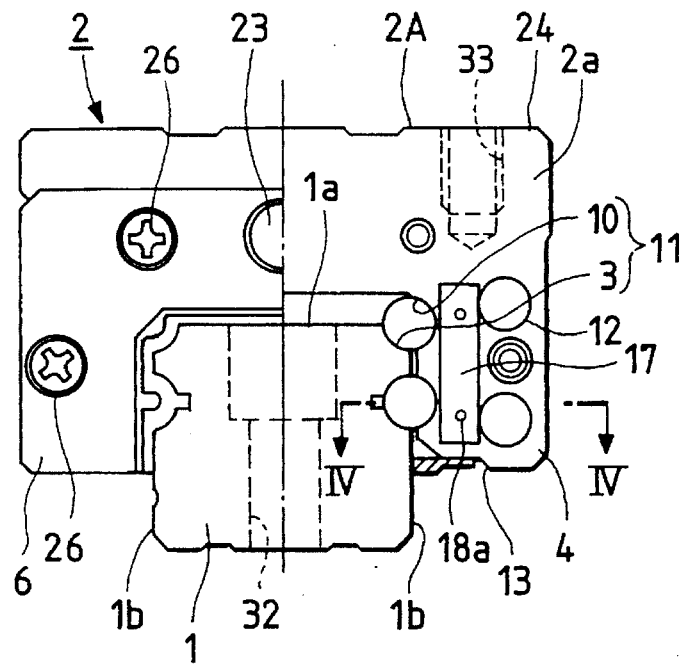
FIG. 1 is a general front view of a linear guide apparatus with a half of an end cap cutaway therefrom, the end cap serving as an embodiment of the present invention.

As shown in FIG. 1, a slider 2 is fitted over a guide rail 1 that extends in an axial direction. The guide rail 1 has ball rolling grooves 3 extending on both side surfaces thereof in the axial direction. The slider main body 2A of the slider 2 is substantially C-shaped in horizontal section. Both upper and lower ball rolling grooves 10 confronting two upper and lower ball rolling grooves 3 of the guide rail 1 are formed in the inner side surface of each of sleeve portions 4 of the slider 2. These confronting grooves 3, 10 form two upper and lower ball rolling paths 11. Further, two upper and lower ball return paths 12 are formed in the thick wall portion of each sleeve portion 4 of the slider main body 2A. These ball return paths 12 pass through the thick wall portion in the axial direction so as to extend in parallel with the ball rolling paths 11.

An under seal receiving stepped portion 13 is provided on the lower surface of each sleeve portion 4 of the slider main body 2A. The under seal receiving stepped portion 13 is formed by forming a recessed portion on an inner surface of each sleeve portion 4, and extends all along the slide body 2A.

Figure 4:
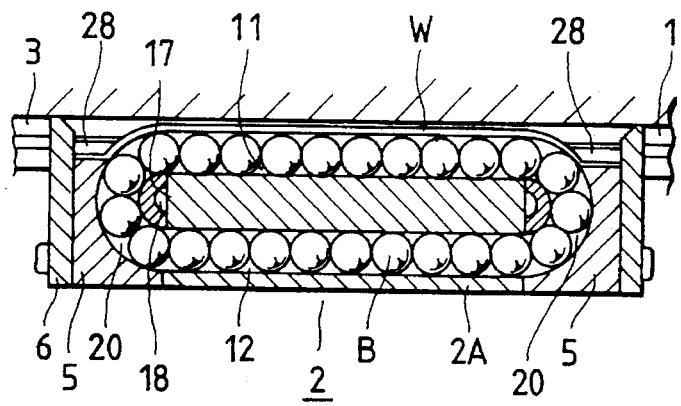
FIG. 4 is a sectional view taken along a line IV—IV in FIG. 1.

An end cap 5 that is fitted with both front and rear ends of the slider main body 2A is provided with an injection-molded product made of synthetic resin. The horizontal section of the end cap 5 is substantially C-shaped in a manner similar to the slider main body 2A. Each of sleeve portions 14 on both left and right sides has not only two semicircular recess portions 15 in both upper and lower steps on the side of a contact surface 5a (see FIG. 2) that is to be abutted against a surface 2a of the slider main body 2A, but also a semicylindrical recess groove 16 that crosses the middle of the semicircular recess grooves 15. A return guide 17 is engaged to each semicylindrical recess groove 16 so that a semidoughnut curved path 20 is formed (FIG. 4). An axially extending oil circulation groove 18 is arranged on the inner circumferential surface of the return guide 17. An oil supply circulation hole 18a opens onto the outer circumferential surface of the return guide 17 from the oil circulation groove 18 (FIG. 1).

The semidoughnut curved paths 20 cause the ball rolling path 11 to communicate with the ball return path 12. As a result, the ball rolling path 11, the ball return path 12 and the curved paths 20 form an endless circulation path. A plurality of balls B are loaded into the endless circulation paths (see FIG. 4).

Figure 2:
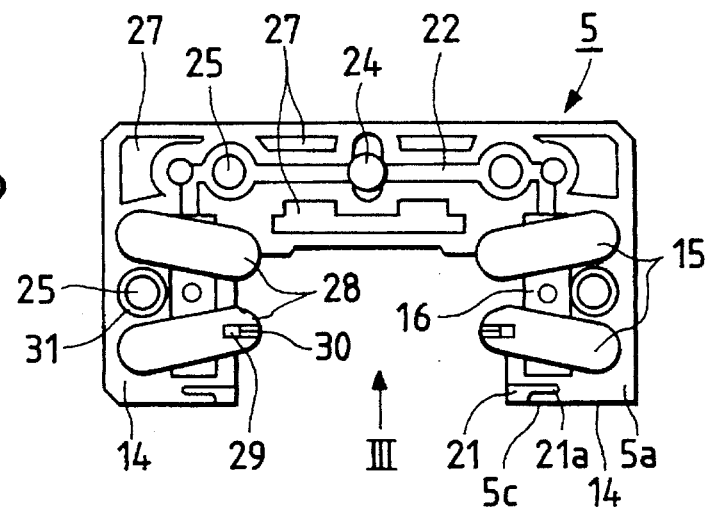
FIG. 2 is a rear view of the end cap.

An under seal holding groove 21 is provided in the lower surface 5c of each sleeve portion 14 of the thus formed end cap 5 as shown in FIG. 2. The under seal holding groove 21 is formed by cutting an inward portion of the lower surface of the sleeve portion 14 so as to match the section of an under seal 40 that will be described later. The under seal holding groove 21 is molded so as to have a depth L from the surface 5a of the end cap 5. As shown in FIG. 2, an oil supply groove 22 communicates with the oil circulation groove 18 of the return guide 17. The oil supply groove 22 further communicates with a mounting hole 24 for mounting an oil supply nipple 23 shown in FIG. 1. An insertion hole 25 allows a mounting screw 26 to fix the end cap 5 to the slider main body 2A. Recess portions 27 are scatteringly formed around the flat land portion of the oil supply groove 22 for lightening the end cap 5.

Figure 3:
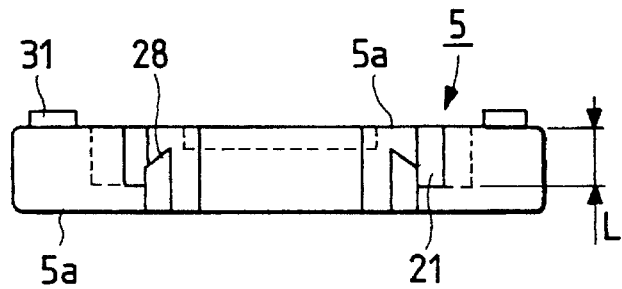
FIG. 3 is a bottom view as viewed from an arrow III in FIG. 2.

In each curved path 20 of the end cap 5, the inner end portion for guiding the outer surface of each rolling ball B is projected in semicircular shape to form projections 28 for scooping the balls as shown in FIGS. 2 to 4. Each ball scooping projection 28 is formed so that the acutely angled end thereof is fitted into the corresponding ball rolling groove 3 of the guide rail 1. Further, on the base of the ball scooping projection 28 are not only a retainer hole 29 for supporting an end of a wire retainer W by inserting the wire retainer W in the axial direction, but also a holding groove 30 that communicates with the retainer hole 29 from the end of the ball scooping projection 28. A guide projection 31 is projected from the surface 5a of the end cap 5 to ensure accuracy in fitting the end cap 5 with the slider main body 2A. The mounting screw insertion hole 25 passes through the guide projection 31.

As shown in FIG. 1, a hole 32 for inserting a bolt is formed to fix the guide rail 1 to a base (not shown) or the like during the operation of the linear guide apparatus. Further, a hole 33 is formed to fix a driven body like a table to the slider 2 with the bolt.

Figure 5:
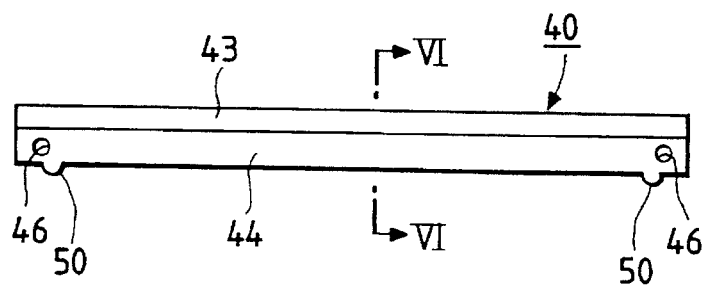
FIG. 5 is a bottom view of an under seal.
Figure 6:
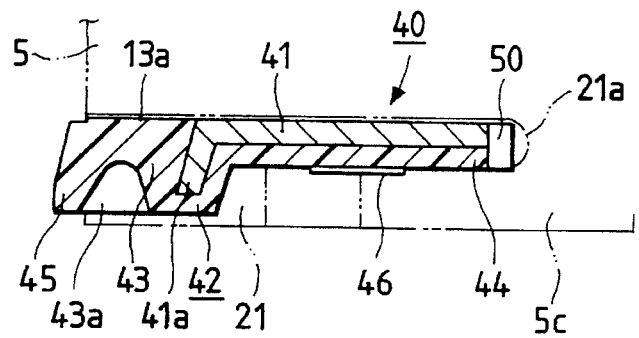
FIG. 6 is a sectional view taken along a line VI—VI of FIG. 5.
Figure 7:
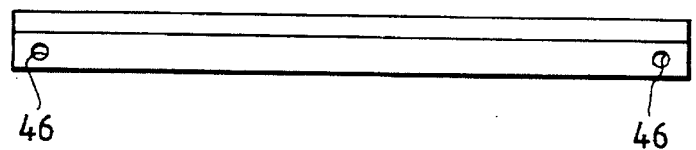
FIG. 7 is a plan view of a conventional under seal.

FIGS. 5 and 6 show the under seal 40. The under seal 40 is slightly longer than the slider main body 2A in total length, and is slightly wider than the groove of the under seal receiving stepped portion 13 on the lower surface of the slider main body in width. The under seal 40 has a core bar 41 and a resilient body 42. The core bar 41 is abutted against the stepped surface 13a of the under seal receiving stepped portion 13. The resilient body 42 is made of rubber or plastic and is fixed integrally to the core bar 41 by bonding or the like.

The resilient body 42 includes a thick wall portion 43 and a thin wall portion 44. The thick wall portion 43 encloses a bent outer edge 41a of the core bar 41, and the thin wall portion 44 covers a single surface of the base portion of the core bar 41. A lip portion 45 is formed on an inward end of the thick wall portion 43 to slidingly contact with a surface 1a of the guide rail. A recess portion 43a is provided on the lower surface of the thick wall portion 43 to increase the margin of deformation of the lip portion 45 so that this recess portion 43a contributes to improving the sealing efficiency.

Projections 50, which are slightly projected outward as viewed in the width direction, are arranged at outer end portions of the width orthogonal to the axial direction of the resilient body 42 (i.e., the outer edge portions of the thin wall portion 44), which are close to both end portions of the resilient body 42 in the longitudinal direction. The projections 50 are molded integrally with the resilient body 42 by projecting the resilient body 42 in substantially semicircular form.

Further, disk-shaped projections 46, which are projected slightly downward from the flat surface of the thin wall portion 44 of the resilient body 42, are arranged at both end portions in the longitudinal direction of the resilient body 42, both end portions being close to the projections 50. The disk-shaped projections 46 are separate from the projections 50.

The operation of the aforementioned embodiment will be described next. The under seal 40 is attached to the end caps in the following procedure.

After the end caps 5 have been fixed to both ends of the slider main body 2A, the end portions of the under seal 40 are inserted into the under seal holding grooves 21 at a stretch in a horizontal direction with respect to the sides confronting to the guide rail 1. As a result, both the base portion of the core bar 41 and disk-shaped projection 46 of the under seal are fitted into narrow groove spaces 21a of the under seal holding grooves 21 (see FIG. 6). Hence, the end portions of the under seal 40 are reliably held in the under seal holding grooves 21 by the resilient and frictional forces of the disk-shaped projections 46, and further received in the under seal receiving stepped portion 13 of the slider main body 2A.

An end of each projection 50 is slightly projected sideways from the outer edge in the width direction of the under seal 40. The end of each projection 50 is abutted against the depth of the groove space 21a of the corresponding under seal holding groove 21 when the under seal 40 is inserted into the under seal holding grooves 21. Therefore, the under seal 40 is prevented from inserting into the under seal holding groove 21 any further. That is, once the under seal 40 has been inserted as far as the depth of the groove spaces 21a, anyone can arrange the lip portion 45 of the under seal 40 at a position where the lip portion 45 slidingly contact the guide rail surface 1a with a proper seal margin.

When the slider 2 with the under seal 40 assembled thereto is attached to the guide rail 1, the lip portion 45 of the under seal is biased by the resilient force of the projections 50 against the depths of the groove spaces 21a, so that the lip portion 45 is abutted against the guide rail surface la with a proper pressing force. This action of the lip portion 45 completely seals the clearance between the lower part of the slider 2 and the guide rail surface 1a.

Even if the lip portion 45 of the under seal is worn to some extent due to the repeatedly reciprocating operation of the slider 2, the resilient force of the projections 50 causes the under seal 40 to be pushed toward the guide rail surface 1a, thereby automatically adjusting insufficient interference.

Although the case where the projections 50 are arranged at two positions close to both end portions in the longitudinal direction is described in the aforementioned embodiment, the present invention can be applied to only one projection 50 which is formed at a position outside an almost central portion in the longitudinal direction of the under seal 40. Further, the projections 50 can be arranged at more than two positions: e.g., the projections 50 can be located at positions close to both end portions and the central portion, respectively.

Still further, while the case where the present invention is applied to a linear guide apparatus having two rolling element rolling grooves on a single side has been described in the aforementioned embodiment, the present invention is applicable to other types of linear guide apparatuses. The rolling elements used may be of ball type or roller type.

As described in the foregoing, according to the present invention, resilient projections are provided for pressing the inner edge portion of the under seal onto the guide rail, the resilient projections being located outside the width orthogonal to the axial direction of the under seal of the linear guide apparatus. Therefore, since the projections can be used to prevent the lip portion of the under seal on the inner edge from being displaced when the under seal is attached to the end caps, the present invention provides the advantage that anyone, skilled or unskilled, can attach the under seal to the linear guide apparatus properly without fail.

What is claimed is:

1. A linear guide apparatus comprising:

a guide rail extending axially and including a first rolling element groove formed on a side surface thereof;

a slider fitted with the guide rail and including a sleeve portion and a second rolling element groove formed on an inner side surface of the sleeve portion, the second rolling element groove of the slider confronting the first rolling element groove of the guide rail, wherein the sleeve portion includes a stepped portion in a lower portion thereof; and an under seal attached to the lower portion of the sleeve portion of the slider and projected from the inner side surface of the sleeve portion to slidingly contact with a surface of the guide rail, wherein the under seal is received by the stepped portion and comprises a core bar abutted against the stepped portion and a resilient body fixed integrally to the core bar, and wherein the under seal includes a first projection arranged at an outer edge portion of a width of the under seal, the width being orthogonal to an axial direction of the under seal, wherein the first projection is molded integrally with the resilient body by projecting an outer edge of the resilient body in substantially semicircular form, the first projection having resiliency for pressing an inner edge portion of the under seal onto the guide rail.

2. The linear guide apparatus of claim 1, wherein the first projection is shaped in substantially semicircular form.

3. The linear guide apparatus of claim 1, wherein the resilient body includes:

a thick wall portion for enclosing a bent outer edge of the core bar;

a thin wall portion for covering a surface of the core bar;

a lip portion formed on an inward end of the thick wall portion to slidingly contact with the surface of the guide rail; and a recess portion formed on a lower surface of the thick wall portion.

4. The linear guide apparatus of claim 3, wherein the under seal includes a second projection projected in a disk shape downward from a surface of the thin wall portion of the resilient body.

5. A linear guide apparatus comprising:

a guide rail extending axially and including a first rolling element groove formed on a side surface thereof;

a slider fitted with the guide rail and including a sleeve portion and a second rolling element groove formed on an inner side surface of the sleeve portion, the second rolling element groove facing the first rolling element groove; and an under seal attached to the sleeve portion in a lower portion thereof and projecting from the inner side surface of the sleeve portion to slidingly contact the guide rail, the under seal comprising a core bar abutting the lower portion and a resilient body fixed integrally to the core bar, wherein the under seal includes a first projection arranged at an outer edge portion in a width direction of the under seal which is orthogonal to an axial direction of the guide rail, wherein the first projection is molded integrally with the resilient body by projecting an outer edge of the resilient body in substantially semicircular form, the first projection having resiliency for pressing an inner edge portion of the under seal onto the guide rail.

6. The linear guide apparatus of claim 5, wherein the sleeve portion includes a stepped portion receiving the under seal in the lower portion.

7. The linear guide apparatus of claim 5, wherein the resilient body comprises:

a first wall portion enclosing a bent outer edge of the core bar;

a second wall portion covering the core bar;

a lip portion formed on an inward end of the first wall portion to slidingly contact the guide rail; and a recess portion formed on a lower surface of the first wall portion.

8. The linear guide apparatus of claim 7, wherein the under seal includes a second projection projected in a disk shape downward from the second wall portion.

* * * * *